(12) United States Patent
Sharma

(10) Patent No.: US 9,247,054 B2
(45) Date of Patent: *Jan. 26, 2016

(54) SYSTEMS AND METHODS FOR GENERATING AND TESTING INTERACTIVE VOICE RESPONSE APPLICATIONS

(75) Inventor: Rajesh Sharma, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 499 days.

This patent is subject to a terminal disclaimer.

(21) Appl. No.: 13/205,934

(22) Filed: Aug. 9, 2011

(65) Prior Publication Data

US 2011/0293075 A1 Dec. 1, 2011

Related U.S. Application Data

(63) Continuation of application No. 11/312,334, filed on Dec. 21, 2005, now Pat. No. 8,019,057.

(51) Int. Cl.
*H04M 11/00* (2006.01)
*H04M 3/493* (2006.01)
*H04M 3/24* (2006.01)

(52) U.S. Cl.
CPC ............... *H04M 3/493* (2013.01); *H04M 3/24* (2013.01)

(58) Field of Classification Search
CPC combination set(s) only.
See application file for complete search history.

(56) References Cited

U.S. PATENT DOCUMENTS

| | | | |
|---|---|---|---|
| 5,608,786 A | 3/1997 | Gordon | |
| 5,675,507 A | 10/1997 | Bobo | |
| 5,764,910 A | 6/1998 | Shachar | |
| 5,802,518 A | 9/1998 | Karaev et al. | |
| 5,884,032 A | 3/1999 | Bateman et al. | |
| 6,052,367 A * | 4/2000 | Bowater et al. | 370/352 |
| 6,181,781 B1 | 1/2001 | Porter et al. | |
| 6,282,270 B1 | 8/2001 | Porter | |
| 6,400,807 B1 * | 6/2002 | Hewitt et al. | 379/88.11 |
| 6,430,609 B1 | 8/2002 | Dewhurst et al. | |
| 6,718,017 B1 * | 4/2004 | Price et al. | 379/88.22 |
| 6,748,055 B1 | 6/2004 | Borman et al. | |
| 6,754,711 B1 | 6/2004 | Dodrill et al. | |
| 6,766,298 B1 | 7/2004 | Dodrill et al. | |
| 6,883,015 B1 | 4/2005 | Geen et al. | |
| 6,940,952 B1 | 9/2005 | Kleinfelter et al. | |
| 6,961,336 B2 | 11/2005 | Coggeshall | |
| 6,973,617 B1 | 12/2005 | Parasu | |
| 6,980,313 B2 | 12/2005 | Sharif et al. | |
| 6,981,207 B1 | 12/2005 | Bakman et al. | |
| 7,194,513 B2 | 3/2007 | Sharif et al. | |
| 7,215,743 B2 | 5/2007 | Creamer et al. | |
| 7,216,287 B2 | 5/2007 | Colson et al. | |
| 7,233,655 B2 | 6/2007 | Gailey et al. | |
| 7,245,291 B2 | 7/2007 | Sharif et al. | |
| 7,254,384 B2 | 8/2007 | Gailey et al. | |
| 7,334,050 B2 | 2/2008 | Zondervan et al. | |
| 7,359,960 B1 | 4/2008 | Greenblatt | |
| 7,441,016 B2 | 10/2008 | Gailey et al. | |

(Continued)

*Primary Examiner* — Joseph T Phan

(57) ABSTRACT

A method for testing an interactive voice response application may include storing a number of files associated with interactive voice response applications. The method may also include receiving a selection from a user, where the selection corresponds to a first one of the files. The files may include a number of prompts and may be stored in a first format. The method may further include accessing the first file and generating a second file based on the first file, where the second file includes links to audio files associated with the prompts and is stored in a second format.

21 Claims, 10 Drawing Sheets

(56) References Cited

U.S. PATENT DOCUMENTS

| | | |
|---|---|---|
| 7,472,091 B2 | 12/2008 | Gailey et al. |
| 7,559,016 B1 | 7/2009 | Rakowski et al. |
| 7,640,006 B2 | 12/2009 | Portman et al. |
| 7,660,399 B2 | 2/2010 | Borman et al. |
| 7,764,770 B2 | 7/2010 | Kleinfelter et al. |
| 7,769,001 B2 | 8/2010 | Narasimhan et al. |
| 2003/0204404 A1* | 10/2003 | Weldon et al. ............. 704/270.1 |
| 2004/0017898 A1* | 1/2004 | Reynolds ................... 379/88.18 |
| 2008/0130860 A1* | 6/2008 | Mullis et al. ............ 379/211.02 |
| 2008/0144786 A1* | 6/2008 | Wang et al. ................ 379/88.18 |
| 2010/0189230 A1* | 7/2010 | Jackson et al. ............ 379/88.22 |

\* cited by examiner

English/Spanish User Language Selection

DialogState: GetUserLanguage     🔊 Grammar Dialog

PREVIOUS: *Entry*

Prompts

| Condition | Name | Wording | Barge-in |
|---|---|---|---|
| Initial | MCIlanguage_initial1 | To continue in English, please stay on the line. | Yes |
|  | MCIlanguage_initial2 | Para continuar en Espanol, diga 'espanol'. |  |
| Retry 1 | MCIerr_prefix1 | [I'm sorry, I didn't understand that.] | yes |
|  | MCIlanguage_initial1 | To continue in English please stay on the line. |  |
|  | MCIlanguage_initial2 | Para continuar en Espanol, diga 'espanol'. |  |
| Retry 2 | MCIerr_prefix3 | [I'm still having trouble understanding.] | Yes |
|  | MCIlanguage_initial1 | To continue in English please stay on the line. |  |
|  | MCIlanguage_initial2 | Para continuar en Espanol, diga 'espanol'. |  |
| Help | MCIhelp1_prefix | Here's some help | Yes |
|  | MCIlanguage_initial1 | To continue in English please stay on the line. |  |
|  | MCIlanguage_initial2 | Para continuar en Espanol, diga 'espanol'. |  |

| Option | Grammar Slot | Action | Confirm |
|---|---|---|---|
| English | language | Go to: *GetUserAccountNumber* | Never |
| Spanish / *espanol* | language | Go to: *Exit Condition - Spanish* | Never |
| Max errors |  | Go to: *Exit*, condition Maximum Error |  |

SYSTEMS AND METHODS FOR GENERATING AND TESTING INTERACTIVE VOICE RESPONSE APPLICATIONS

RELATED APPLICATION

This application is a continuation of U.S. patent application Ser. No. 11/312,334, filed on Dec. 21, 2005, the disclosure of which is hereby incorporated herein by reference.

FIELD OF THE INVENTION

The invention relates to interactive voice response systems and, more particularly, to generating and testing interactive voice response applications.

BACKGROUND OF THE INVENTION

Conventional interactive voice response systems (IVR) provide audio prompts that assist a caller in navigating through a menu that provides various options. For example, an IVR application may provide a first audio prompt that lists a number of services available via the IVR application. The prompt may be a pre-recorded audio message that requests that the caller voice a selection from a number of options. Based on the caller's selection, the IVR application may provide additional prompts to help the caller in obtaining and/or requesting the desired information.

In many IVR applications, a large number of prompts may be required before the caller is able to ultimately receive or request the desired information. Generating the appropriate dialog for these prompts, recording the actual audio prompts and then inserting the audio prompts into the IVR application at the appropriate locations is a difficult and time consuming task.

In addition, testing a complex IVR application with a large number of prompts to ensure that the recorded audio files accurately mirror the prepared dialog is also time consuming. For example, as applications evolve, the dialog for the prompts often changes. Each time a change occurs, the IVR application must be re-tested to ensure that the desired wording or dialog of the recorded audio file is correct and that the audio file is inserted into the IVR application at the appropriate location. Due to frequent changes in many IVR applications, which result in new prompts, modified prompts and new locations for prompts, it is often difficult for a party responsible for testing the IVR application to verify the accuracy of the IVR application.

SUMMARY OF THE INVENTION

According to one aspect, a method for testing an interactive voice response application is provided. The method includes storing a plurality of files associated with a plurality of interactive voice response applications. The method also includes receiving a selection from a first user, where the selection corresponds to a first one of the files and the first file comprises a plurality of prompts and being stored in a first format. The method further includes accessing the first file and generating a second file based on the first file. The second file includes links to audio files associated with the prompts and is stored in a second format.

According to another aspect, a system including an input device and processing logic is provided. The input device is configured to receive a first selection from a user, the first selection being associated with an interactive voice response program comprising a plurality of prompts. The processing logic is configured to access a first file based on the first selection, the first file being stored in a first format. The processing logic is also configured to generate a second file using the first file, the second file having a second format and including links to audio files associated with the plurality of prompts.

Another aspect of the present invention provides a computer-readable medium that includes sequences of instructions, which when executed by a processor, cause the processor to provide a user interface to a user and receive a first selection via the user interface, where the first selection is associated with an interactive voice response program comprising a plurality of prompts. The instructions also cause the processor to access a first file based on the first selection, the first file being stored in a first format. The instructions further cause the processor to generate a second file based on the first file, the second file having a second format and including links to audio files associated with the plurality of prompts.

Other features and advantages of the invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation may represent like elements throughout.

FIGS. 7A-7D illustrate exemplary documents and interface screens associated with generating and testing an IVR application, consistent with an implementation of the invention.

DETAILED DESCRIPTION

Figure 1:
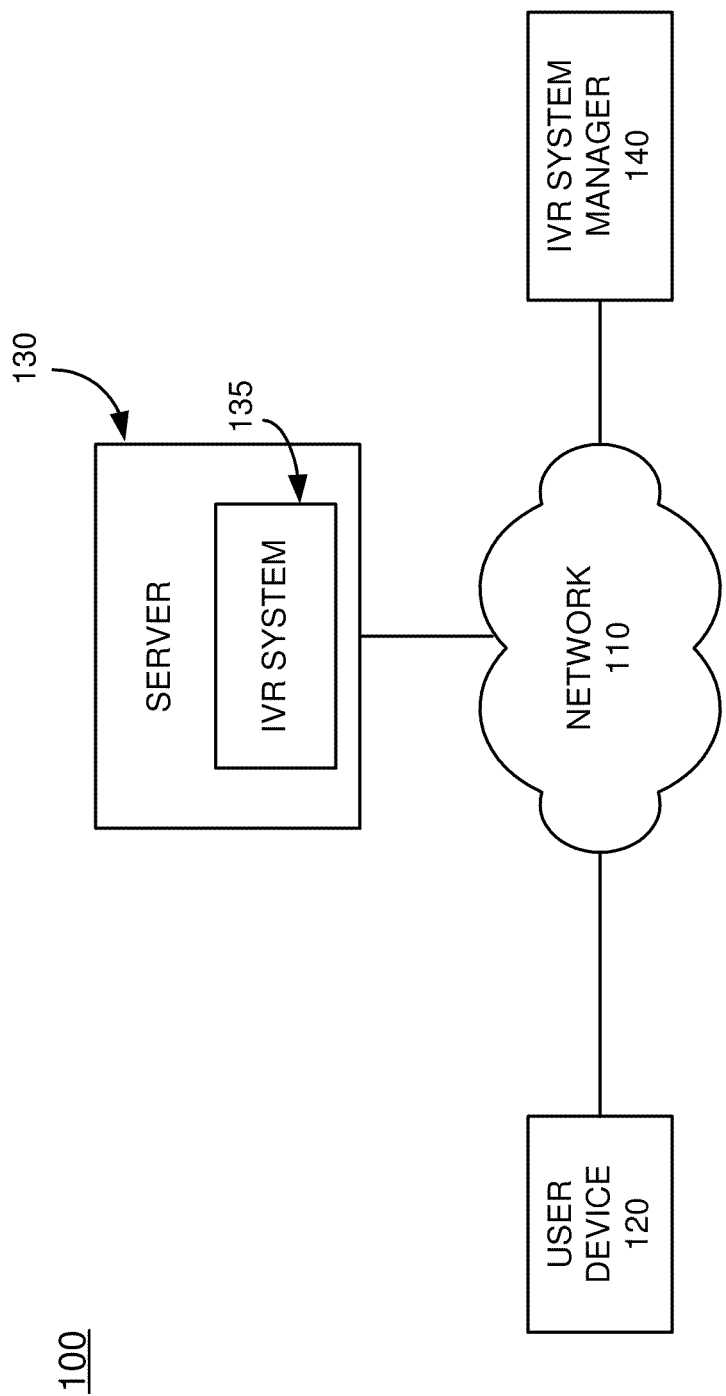
FIG. 1 is a block diagram of an exemplary system in which methods and systems consistent with the invention may be implemented.

FIG. 1 is a block diagram of an exemplary system 100 in which methods and systems consistent with the invention may be implemented. System 100 may include network 110, user device 120, server 130 and IVR system manager 140. The exemplary configuration illustrated in FIG. 1 is provided for simplicity. It should be understood that a typical system may include more or fewer devices than illustrated in FIG. 1. In addition, other devices that facilitate communications between the various entities illustrated in FIG. 1 may also be included in system 100.

Network 110 may include any type of network, such as a local area network (LAN), a wide area network (WAN), a public telephone network (e.g., the public switched telephone network (PSTN)), a wireless network, a virtual private network (VPN), the Internet, an intranet, or a combination of networks. The connections shown in FIG. 1 may be wired, wireless and/or optical connections.

Network 110 may further include one or more devices, such as a network gateway, that allow divergent transport networks to communicate and cooperatively carry traffic. The network gateway may also adapt analog or pulse code modulation (PCM) encoded voice signals to a packetized data stream suitable for transport over network 110.

User device 120 may include any type of telephone that is used to place and receive telephone calls. For example, user device 120 may be a standard telephone, a cordless telephone, a cellular telephone or any other type of telephone.

User device 120 may also include any type of device that is capable of transmitting and receiving voice signals to/from a network. For example, user device 120 may include any client device, such as a personal computer (PC), a laptop computer, a personal digital assistant (PDA), a web-based appliance, etc., that is configured to provide telephone functions and is able to transmit/receive voice signals via network 110. User device 120 may, for example, be a session initiation protocol (SIP)-based telephone device. In this case, the SIP-based telephone device may take the form of a standalone device, e.g., a SIP telephone designed and configured to function and appear like a conventional telephone. A SIP-based telephone device may also include a software client that may run, for example, on a conventional PC, laptop computer or other computing device.

Server 130 may include any server and/or computing device that is able to connect to network 110 and transmit and receive information via network 110. Server 130 may also include a telephone device (not shown) that interfaces with network 110 to receive and/or place telephone calls. In an exemplary implementation consistent with the invention, server 130 may include an interactive voice response (IVR) system 135 that provides one or more IVR applications to users, such as a caller associated with user device 120. IVR system 135 is illustrated in FIG. 1 as being implemented in server 130. It should be understood that IVR system 135 may be located externally from server 130 in other implementations.

IVR system manager 140 may include a workstation or computer, such as a personal computer, laptop computer, etc., that may be used to facilitate management of IVR system 135. For example, IVR system manager 140 may be used to generate, modify, maintain and/or test portions of an IVR application executed by IVR system 135. In an exemplary implementation, IVR system manager 140 may convert the text corresponding to audio prompts used by an IVR application into a format that facilitates testing the recorded audio files associated with these prompts to determine their accuracy, as described in more detail below.

Server 130 and IVR system manager 140 are illustrated in FIG. 1 as being connected via network 110. In alternative implementations, server 130 and IVR system manager 140 may be connected directly to each other, connected via a LAN, connected via a private network, etc. In still other alternative implementations, the functions performed by server 130 and IVR system manager 140, described in more detail below, may be performed by a single device/platform.

Figure 2:
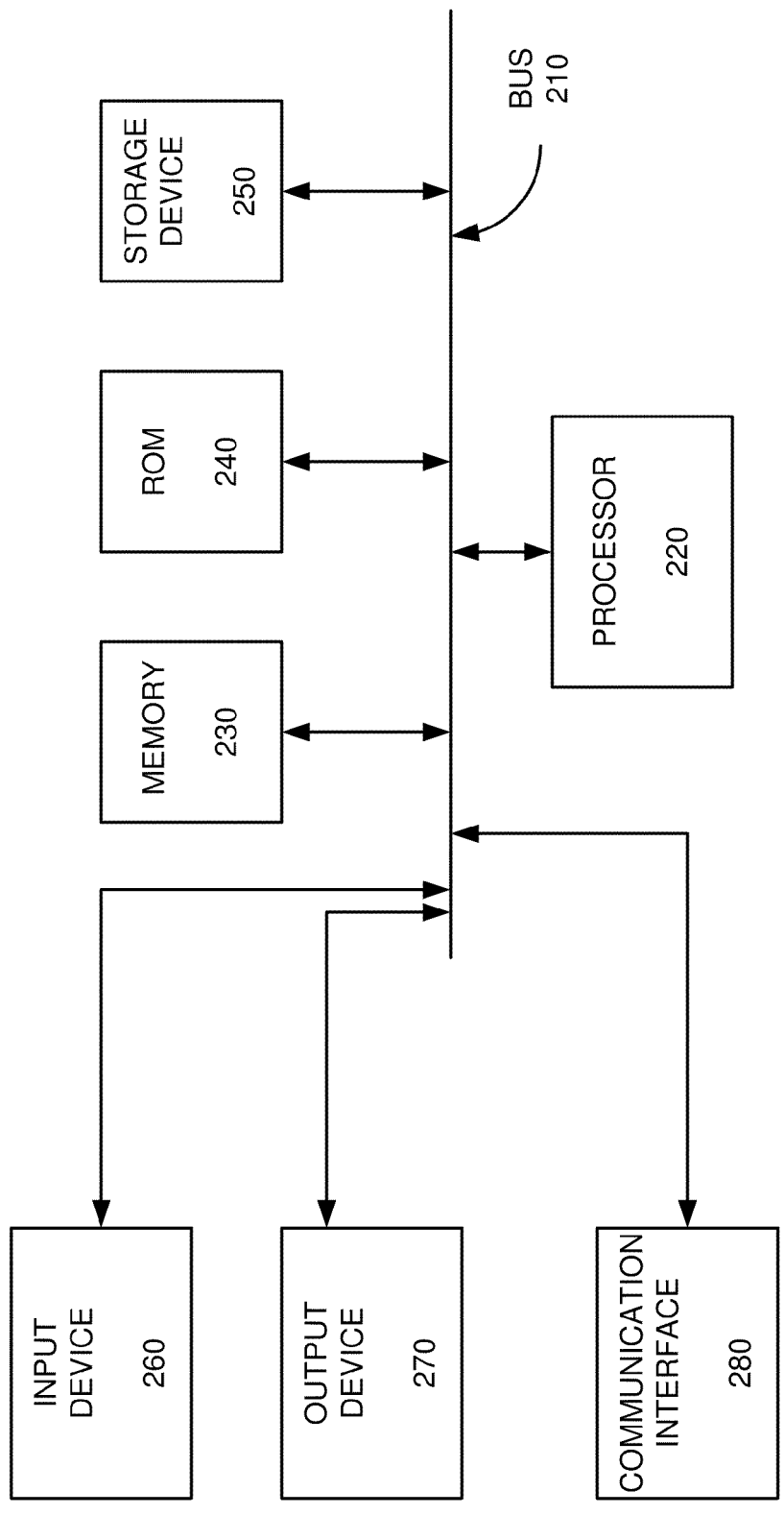
FIG. 2 is an exemplary block diagram of the IVR system manager of FIG. 1.

FIG. 2 illustrates an exemplary configuration of IVR system manager 140 in an implementation consistent with the invention. Other configurations may alternatively be used. In an exemplary implementation, server 130 may be configured in a manner similar to IVR system manager 140. IVR system manager 140 may include a bus 210, a processor 220, a memory 230, a read only memory (ROM) 240, a storage device 250, an input device 260, an output device 270, and a communication interface 280. Bus 210 permits communication among the components of IVR system manager 140.

Processor 220 may include any type of processor or microprocessor that interprets and executes instructions. Memory 230 may include a random access memory (RAM) or another dynamic storage device that stores information and instructions for execution by processor 220. Memory 230 may also be used to store temporary variables or other intermediate information during execution of instructions by processor 220.

ROM 240 may include a ROM device and/or another static storage device that stores static information and instructions for processor 220. Storage device 250 may include a magnetic disk or optical disk and its corresponding drive and/or some other type of magnetic or optical recording medium and its corresponding drive for storing information and instructions.

Input device 260 may include one or more mechanisms that permit an operator to input information to IVR system manager 140, such as a keyboard, a mouse, a pen, voice recognition and/or biometric mechanisms, etc. Output device 270 may include one or more mechanisms that output information to the operator, including a display, a printer, one or more speakers, etc. Communication interface 280 may include any transceiver-like mechanism that enables IVR system manager 140 to communicate with other devices and/or systems. For example, communication interface 280 may include a modem or an Ethernet interface to a LAN. Alternatively, communication interface 280 may include other mechanisms for communicating via a network.

IVR system manager 140, consistent with the invention, may perform processing associated with, for example, testing an IVR application executed by IVR system 135 in response to processor 220 executing sequences of instructions contained in memory 230. Such instructions may be read into memory 230 from another computer-readable medium, such as storage device 250, or from a separate device via communication interface 280. It should be understood that a computer-readable medium may include one or more memory devices or carrier waves. Execution of the sequences of instructions contained in memory 230 causes processor 220 to perform the acts that will be described hereafter. In alternative embodiments, hard-wired circuitry may be used in place of or in combination with software instructions to implement the invention. Thus, implementations consistent with the invention are not limited to any specific combination of hardware circuitry and software.

Figure 3:
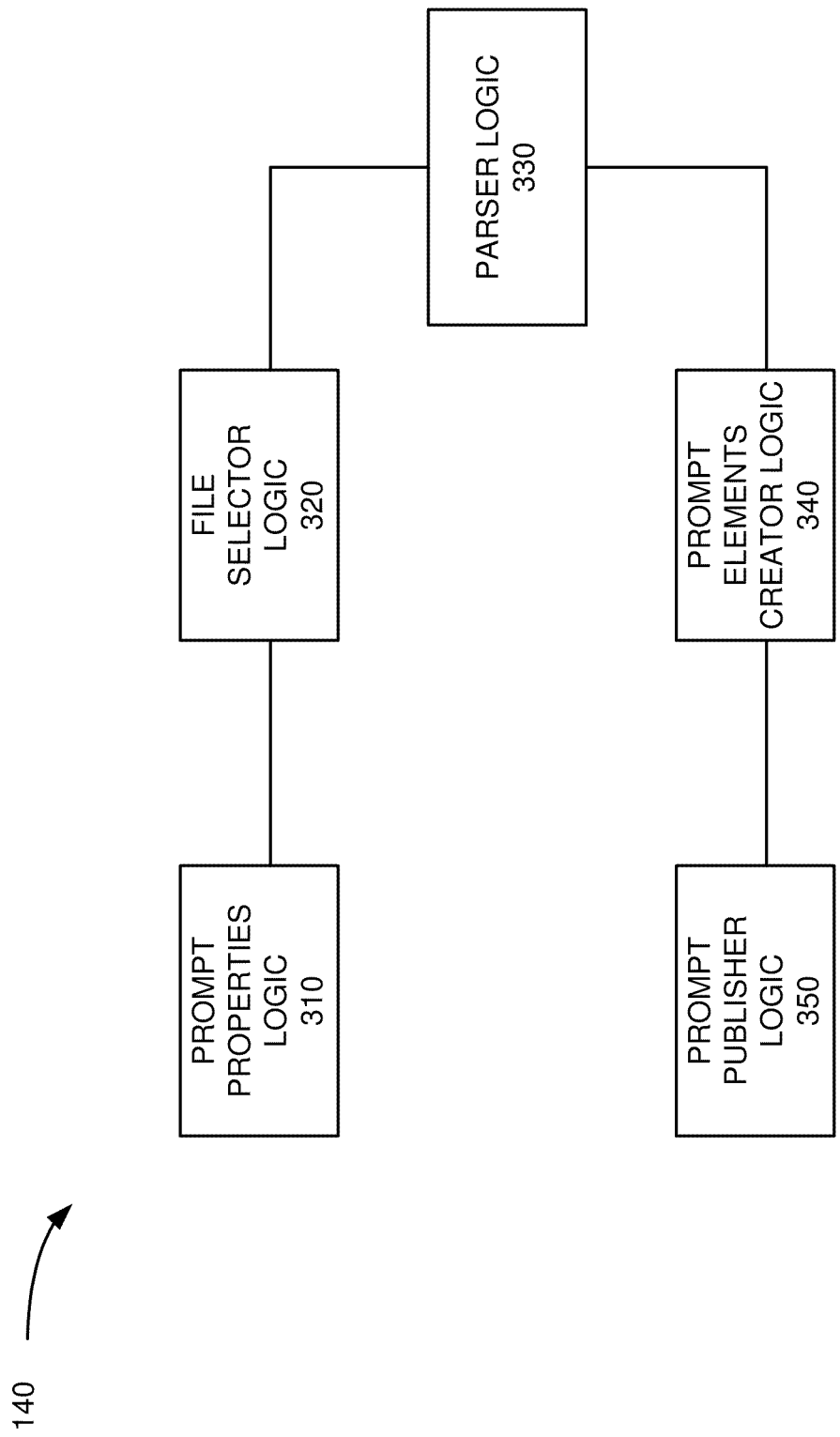
FIG. 3 is an exemplary functional block diagram of the IVR system manager of FIG. 2.

FIG. 3 is a functional block diagram of IVR system manager 140, according to an exemplary implementation consistent with the invention. The logical blocks illustrated in FIG. 3 may be implemented in software, hardware, or a combination of hardware and software. For example, in one implementation, the logical blocks implemented in FIG. 3 may be implemented by processor 220 (FIG. 2) executing software instructions stored in, for example, memory 230.

Referring to FIG. 3, IVR system manager 140 may include prompt properties logic 310, file selector logic 320, parser logic 330, prompt elements creator logic 340 and prompt publisher logic 350. Prompt properties logic 310 may be used to assist a user responsible for reviewing, testing and/or modifying prompts for an IVR application to select properties associated with the prompts. For example, prompt properties logic 310 may allow a user responsible for reviewing/testing prompts in an IVR application executed by IVR system 135 to select how the prompts will be displayed to the user. In one implementation, prompt properties logic 310 may allow the user to select an alphabetical listing associated with the prompts. In this case, prompt properties logic 310 may order the prompts in alphabetical order based on a name associated with each of the prompts. Alternatively, prompt properties logic 310 may display the prompts in the order in which they appear in the IVR application.

Prompt properties logic 310 may also allow the user to specify names associated with each of the respective prompts. The names may be used to facilitate retrieving particular prompts and may include, for example, "welcome prompt," "payment prompt," etc. Prompt properties logic 310 may further allow the user to specify a prefix associated with a group of prompts. For example, a group of prompts associated with a particular IVR application may include a common prefix in the name of the prompts. The prefix may identify, for example, a location, a particular IVR application, etc. The prefix may be input by a user when retrieving prompts associated with the IVR application of interest. Allowing a user to specify names and/or prefixes associated with prompts facilitates grouping the prompts for review at a later time. Prompt properties logic 310 may further allow the user to save the location of the audio files associated with the respective prompts. These audio files may be way files recorded for use in the IVR application.

File selector logic 320 may allow the user to select a particular file that may contain the names of the prompts, wording of the prompts and other properties for prompts used in a particular IVR application. The text for these prompts may be generated and stored using, for example, a spreadsheet type program, such as Excel. Alternatively, the file containing text for the prompts may be saved using another type of program, such as a word processing program. File selector logic 320 may provide a user with a list of various files associated with different IVR applications. File selector logic 320 may then allow the user to select the desired file containing the prompts of interest.

Parser logic 330 may parse a file that the user selects via file selector logic 320. For example, in an exemplary implementation and as discussed above, the file containing the prompts of interest may be a spreadsheet type file, such as an Excel file. In this case, parser logic 330 may parse the information stored in various cells of the spreadsheet into a number of separate elements. These cells may contain the dialog or text that corresponds to the actual voiced audio that will be provided to a caller.

Prompt elements creator logic 340 may create elements for each prompt element generated by parser logic 340. For example, prompt elements creator logic 340 may convert the parsed elements generated by parser logic 330 into another format, such as a hypertext markup language (HTML) format. That is, prompt elements creator logic 340 may take the parsed elements associated with a prompt and convert the parsed elements (e.g., the parsed text corresponding to the prompt) to corresponding HTML elements. In this manner, parser logic 330 automatically converts prompt wording stored in one format, such as a spreadsheet format (e.g., an Excel file) into another format (e.g., an HTML format) that may be used to facilitate testing of the prompts.

Prompt publisher logic 350 may receive information from prompt elements creator logic 340. Prompt publisher logic 350 may then allow a user to save an HTML file that includes hyperlinks to the audio files that will be played to callers. The user can also choose the name of the file and any extension for this HTML file.

Figure 4:
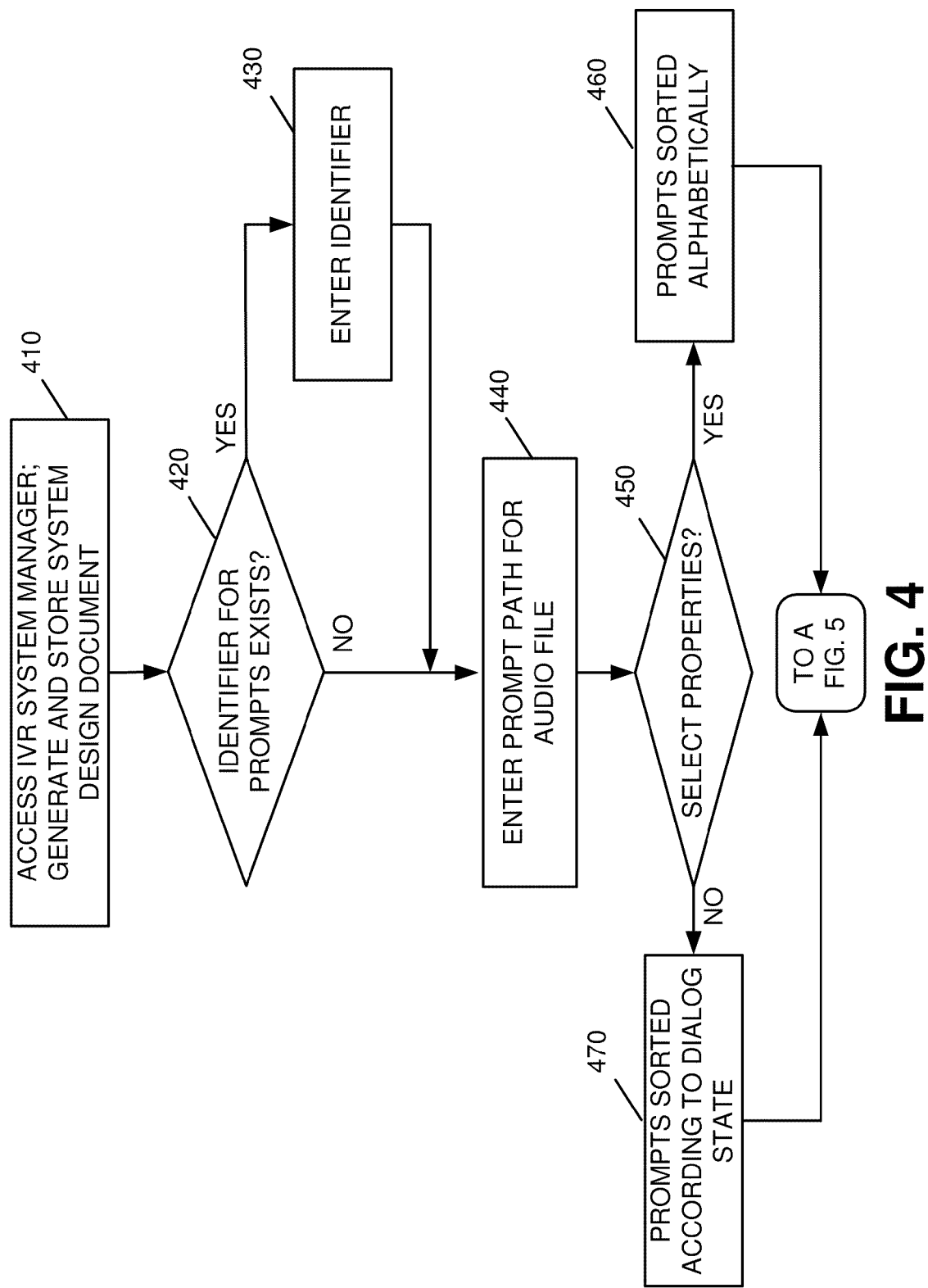
FIGS. 4-6 are flow diagrams illustrating exemplary processing consistent with the invention.

FIG. 4 is a flow diagram illustrating exemplary processing associated with generating, managing and/or testing prompts for an IVR application in an implementation consistent with the invention. Processing may begin with a user accessing IVR system manager 140 and generating a system design document (act 410). For example, a user associated with generating, maintaining and/or testing an IVR application executed by IVR system 135 may access IVR system manger 140 either locally or remotely via, for example, network 110. IVR system manager 140 may require that the user enter a login name and/or password associated with accessing IVR system manager 140. If access is granted, IVR system manager 140 may provide a graphical user interface (GUI) to the user via, for example, output device 270 (FIG. 2). The GUI may include an introduction screen providing instructions for using IVR system manager 140. For example, the GUI may provide instructions that allow the user to generate a file that contains dialog associated with prompts to be executed by IVR system 135. The GUI may also allow the user to save the system design document. In alternative implementations, the system design document may already be created and stored in IVR system manager 140 or a location that may be accessed by IVR system manager 140.

In either case, the GUI may include a screen that allows the user to select the prompts associated with a particular IVR application that the user may wish to test and/or modify. In some implementations, the prompts stored in IVR system manager 140 may be identified by a name and/or a prefix, a location or some other identifier associated with the group of prompts. For example, as discussed previously, prompt properties logic 310 may allow a user to include a prefix or some other identifier with a group of prompts that make up the IVR application. In an exemplary implementation, the prefix may identify the location and/or name of a server, such as server 130, the name of an IVR system, such as IVR system 135, and/or the name of an IVR application executed by IVR system 135. The GUI may include an input box where the user may enter the identifier, e.g., a prefix, associated with the prompts of interest. If an identifier associated with a group of prompts exists (act 420), the user may enter the identifier (act 430). In the event that no identifier for the group of prompts exists, the GUI may allow the user to select the prompts of interest by viewing a listing of the IVR applications that are available and then selecting one of the IVR applications.

After the identifier is provided or if no identifier is provided and the user selects the prompts of interest in another manner, the GUI may request that the user enter a prompt path identifying the location where the audio files associated with the prompts are stored. For example, these audio files may be stored in a memory located externally with respect to IVR system manager 140 or on a storage device (e.g., storage device 250) located within IVR system manager 140. In either case, the user may enter the appropriate prompt path for the audio files associated with the prompts (act 440).

After the prompt paths are entered, IVR system manager 140 may request whether the user wishes to select properties associated with the prompts of interest (act 450). For example, the GUI may provide a selection box with a menu of options regarding the prompts of interest and how the prompts will be displayed to the user. One of the options may allow the user to sort the prompts in alphabetical order based on a name associated with the prompts. If the user selects this option, the prompts provided to the user will be sorted in alphabetical order (act 460). In each case, based on the user's selection, prompt properties logic 310 will sort the prompts of interest in accordance with the desired criteria. If, however, the user does not enter information regarding selecting properties associated with the prompts, IVR system manager 140 may sorts the prompts according to the dialog states of the IVR application (act 470). That is, the prompts will be sorted in the order in which the prompts appear in the IVR application.

The GUI provided by IVR system manager 140 may then allow the user to select a file of interest. For example, file selector logic 320 may provide a display showing a number of files associated with different IVR applications executed by IVR system 135 (act 510). In an exemplary implementation, the files may be spreadsheet type files, such as Excel files. Alternatively, the files may be other types of files, such as Word files, WordPerfect files, etc. Assume that the user selects and opens a file. The user may then view the dialog of the prompts included in the file and determine whether the selected file is the file that he/she wishes to test (act 520). If the file is not the desired file, processing may return to act 510. If the opened file is the file that the user wishes to test, the user may select "Go" or a similar option. IVR system manager 140 may then convert the file into a format for testing (act 530). For example, in an exemplary implementation, the opened file may be a spreadsheet type file, such as an Excel file. In this case, IVR system manager 140 may generate, for example, an HTML file using the spreadsheet file or convert the spreadsheet file into an HTML file. For example, as discussed above with respect to FIG. 3, parser logic 330 and prompt elements creator logic 340 may parse the spreadsheet file and convert the parsed elements into HTML elements. The converted file may also include hyperlinks to the actual audio files associated with the prompts. As discussed previously, the locations or prompt paths of the audio files, e.g., the locations where the way files are stored, may have been provided at act 440. Prompt elements creator logic 340 may use this path/location information to generate hyperlinks to the audio files.

IVR system manager 140 may then save the generated document (act 540). Parties, such as parties associated with testing and/or maintaining IVR applications, may then use the saved file to facilitate testing an IVR application.

Figure 6:
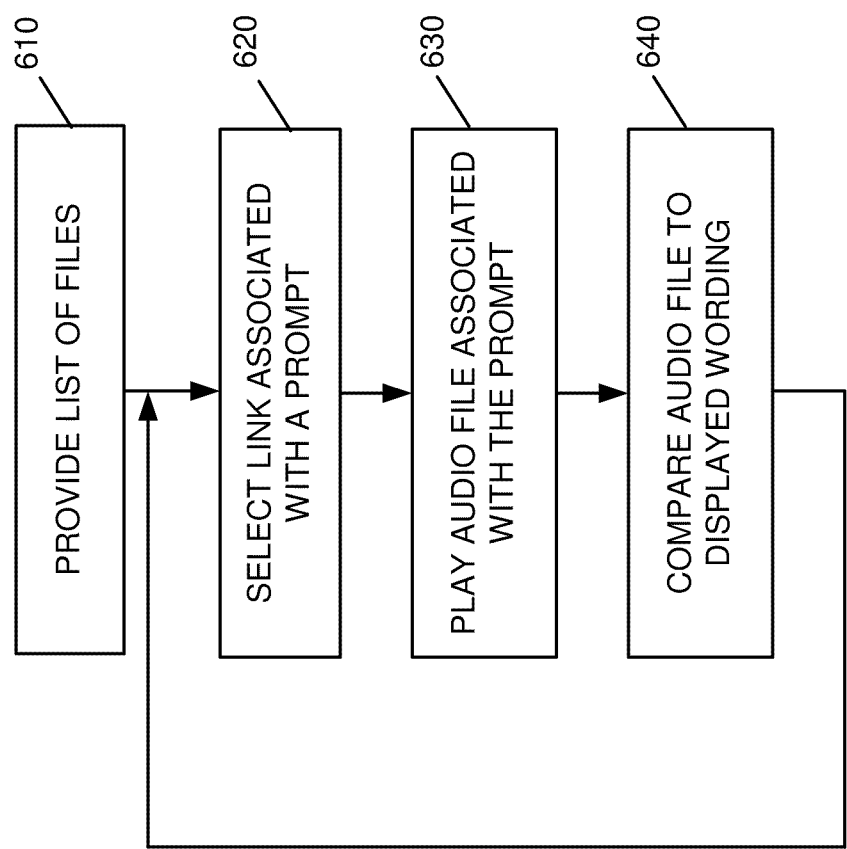

FIG. 6 is a flow diagram illustrating exemplary processing associated with testing, maintaining and/or modifying an IVR application using IVR system manager 140. Processing may begin with a user accessing IVR system manager 140. IVR system manager 140 may provide a list of available files (act 610). These files may be, for example, HTML files, with hyperlinks to the actual audio files corresponding to the prompts. After the user selects a file, IVR system manager 140 may provide a text listing of dialog associated with the prompts. The order of the listed prompts may be based on the user's particular selection at acts 450-470 described above.

Assume that the user selects a particular hyperlink included with one of the displayed prompts (act 620). For example, the user may click on a hyperlink associated with the prompt of interest. IVR system manager 140 may then access the appropriate file based on the hyperlink and play the recorded audio file, e.g., a way file, that corresponds to the selected hyperlink (act 630). The text associated with the prompt may be simultaneously displayed as the audio file is being played. The user may then compare the dialog of the audio file with the displayed text to determine whether the recorded audio file matches the desired wording (act 640). In this manner, the user may easily verify that the audio file is accurate. The user may continue in this manner to select hyperlinks associated with other prompts and compare the audio to the desired wording to ensure the accuracy of the IVR application.

Figure 7B:
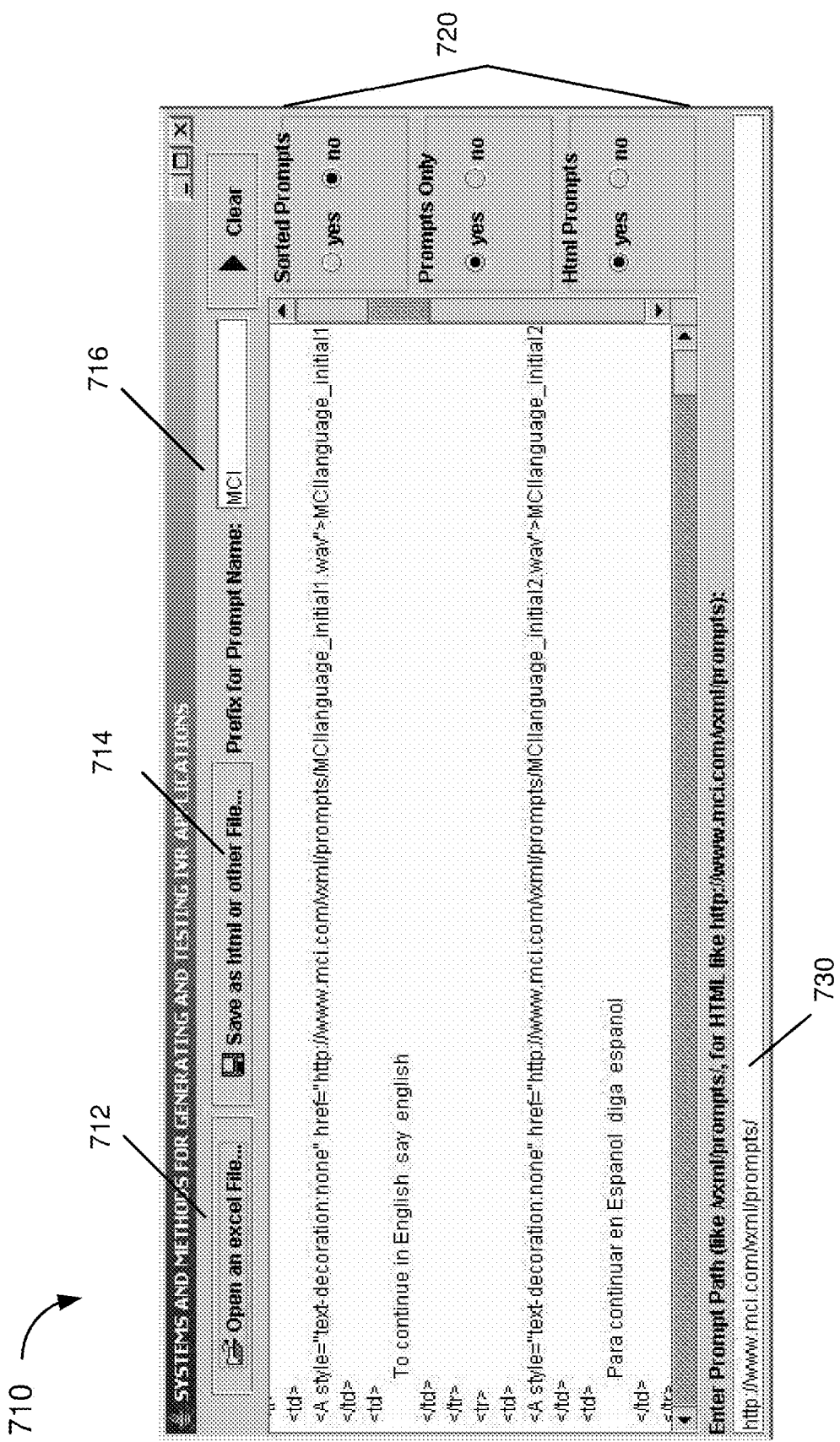

FIGS. 7A-7D illustrate exemplary documents and interface screens associated with generating and testing an IVR application consistent with principles of the invention. For example, as discussed above with respect to act 410, a user may access IVR system manager 140 and generate, edit and/or retrieve a system design document (SDD). Referring to FIG. 7A, SDD 700 illustrates a portion of an exemplary SDD that may be created or retrieved by a user via IVR system manager 140. SDD 700 may be displayed to the user via output device 270 (FIG. 2). As illustrated, SDD 700 may include dialog state information and grammar dialog information. The dialog state information may identify a portion of an IVR application, such as the portion of the IVR application in which the caller's language preference is obtained. For example, the dialog state information may be "GetUserLanguage", as illustrated in FIG. 7A, which represents the prompts associated with obtaining the user's language preference. SDD 700 may also include particular prompt information, such as conditions, names, wordings and barge-in information associated with the dialog state information. SDD 700 may also include option information (e.g., language options), grammar slot information, action information and confirmation information. The information in SDD 700 defines how the IVR application will respond based on particular user inputs.

As described above, a user may select an SDD, such as SDD 700, via a GUI provided by IVR system manager 140. For example, FIG. 7B illustrates an exemplary GUI associated with retrieving an SDD via IVR system manager 140. Referring to FIG. 7B, screen 710 illustrates an exemplary GUI consistent with an implementation of the invention. Referring to FIG. 7B, screen 710 includes an option for opening an Excel file at selection box 712, an option to save a file as an HTML or another type of file at selection box 714 and an option for entering a prefix associated with a prompt name at selection box 716. Screen 710 also includes an input area 720 that allows a user to sort prompts, display only prompts and display HTML prompts. Screen 710 further includes an input area 730 for allowing the user to enter a prompt path associated with the audio files associated with the prompts, as described above at act 440.

Figure 7C:
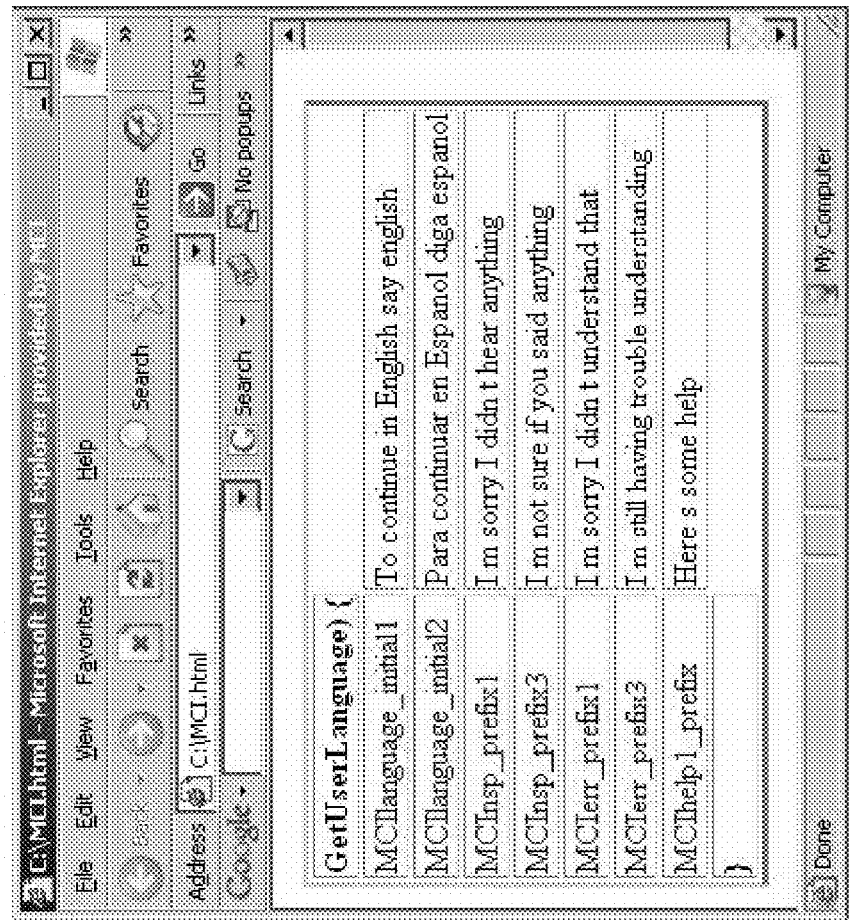

As further described above with respect to act 530, after a user selects a particular file of interest, IVR system manager 140 may convert the selected file into a format for testing, such as an HTML format. FIG. 7C illustrates a portion of an exemplary HTML file 740 that may be generated by IVR system manager 140 in an implementation consistent with the invention. Referring to FIG. 7C, HTML file 740 may include prompt information in HTML format and may also display text associated with the prompts.

Figure 7D:
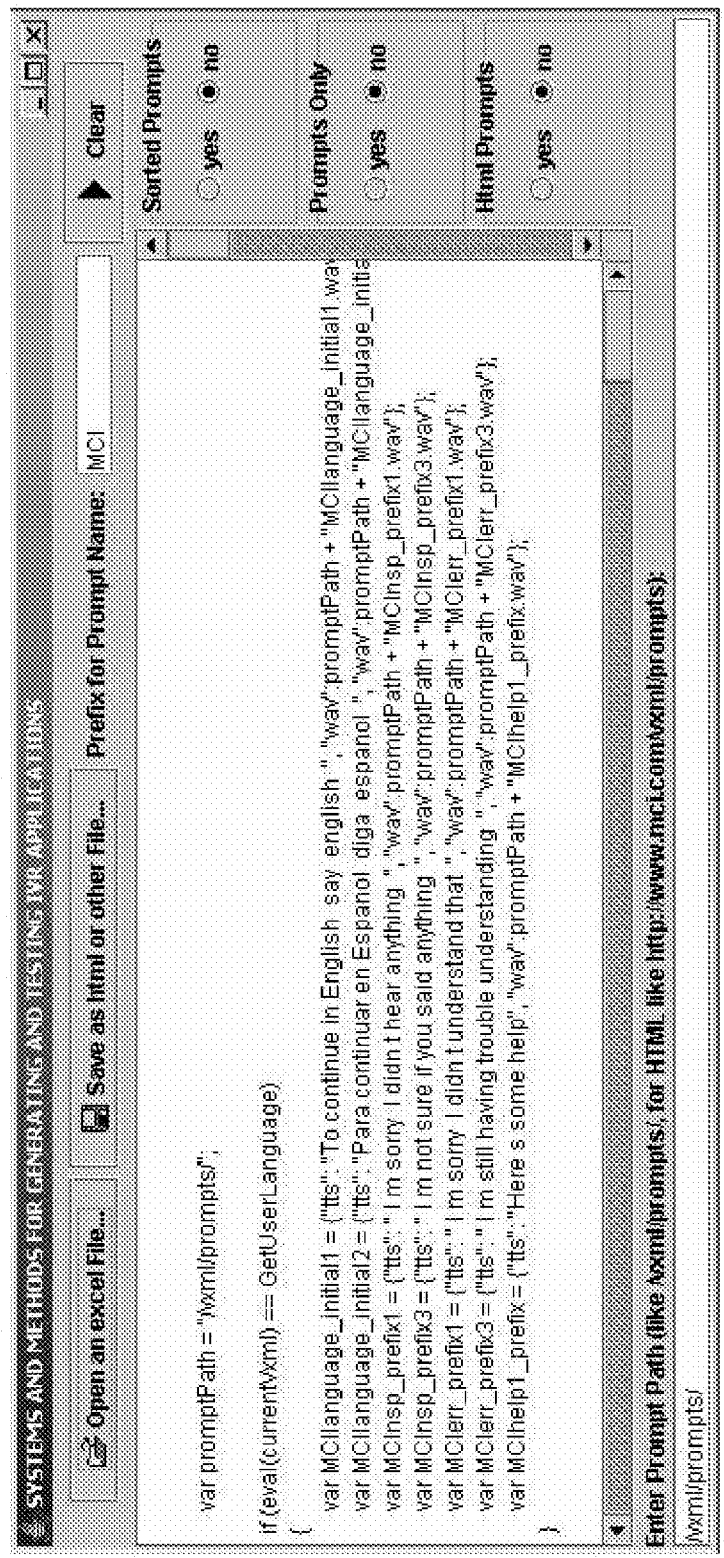

In other implementations, IVR system manager 140 may convert a selected file into other formats to facilitate testing. For example, FIG. 7D illustrates a portion of an exemplary JavaScript file 750 generated by IVR system manager 140 in an implementation consistent with the invention. Referring to FIG. 7D, JavaScript file 740 may include prompt information, such as the name of the prompts, text associated with the various prompts and prompt path information identifying paths associated with the audio files (e.g., way files) that will be played to callers.

FIGS. 7A-7D illustrate only a few exemplary documents and screens consistent with an implementation of the invention. It should be understood that additional interface screens and/or different interface screens than those illustrated in FIGS. 7A-&D may be used in implementations consistent with the invention to facilitate testing an IVR application.

CONCLUSION

Systems and methods consistent with the invention enable a user to test an IVR application via an easy to use interface. Aspects consistent with the invention allow users that are not familiar with particular programming languages that may be used in the IVR application to view text associated with prompts and listen to recorded audio files corresponding to the prompts to ensure the accuracy of the prompts. This permits quicker testing and may result in more accurate testing.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

For example, implementations consistent with the principles of the invention have been described with the example of converting a spreadsheet type design file into an HTML file. It should be understood that implementations consistent with the principles of the invention may convert and/or generate other types of files that facilitate testing IVR applications.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

Figure 5:
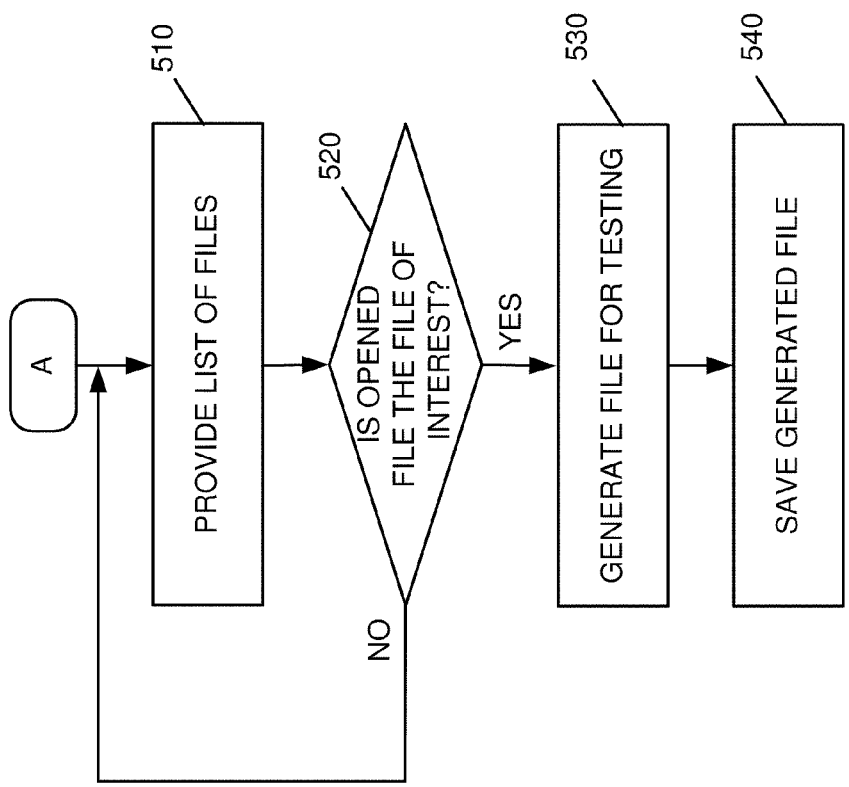

In addition, series of acts have been described with respect to FIGS. 4-6. The order of the acts may be varied in other implementations consistent with the invention. Moreover, non-dependent acts may be performed in parallel. Further, the invention is not limited to any specific combination of hardware circuitry and/or software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A method for testing an interactive voice response application, comprising:
storing a plurality of files associated with a plurality of interactive voice response applications;
receiving a selection from a first user, the selection corresponding to a first one of the plurality of files, wherein the first file comprises a plurality of prompts and is stored in a first format;
accessing the first file;
generating a second file based on the first file, the second file including links to audio files associated with the plurality of prompts and being stored in a second format, wherein the generating a second file includes:
inserting the links in the second file, wherein the links are associated with locations where the audio files associated with the plurality of prompts are stored; the method further comprising:
receiving a second selection from a second user, the second selection corresponding to a first link to a first audio file;
playing the first audio file to the second user; and
displaying text associated with the first audio file to the second user when the first audio file is being played to allow the second user to verify that the first audio file is accurate.

2. The method of claim 1, further comprising:
receiving a first input from the second user, the first input identifying the second file; and
displaying information associated with the plurality of prompts to the second user in response to the first input.

3. The method of claim 1, wherein the first file comprises a spreadsheet type file.

4. The method of claim 3, wherein the second file comprises a hypertext markup language file and the links comprise hyperlinks.

5. The method of claim 1, further comprising:
providing a user interface to the first user, the user interface being configured to:
allow the first user to select at least one property associated with displaying the plurality of prompts.

6. The method of claim 5, wherein a first one of the at least one property allows the first user to select an order in which the plurality of prompts are displayed.

7. The method of claim 6, further comprising:
receiving an input from the first user regarding an order in which the plurality of prompts are to be displayed; and
displaying the plurality of prompts in the selected order.

8. The method of claim 5, wherein the user interface is further configured to:
allow the first user to provide information identifying at least one location where the audio files are stored.

9. The method of claim 5, wherein the user interface is further configured to:
allow the first user to identify a plurality of prompts using a first identifier.

10. The method of claim 9, wherein the first identifier comprises a name, a prefix or a location associated with the plurality of prompts.

11. A system, comprising:
a memory configured to store a plurality of files associated with a plurality of interactive voice response programs;
a display device;
an input device configured to:
receive a first selection from a user, the first selection corresponding to a first one of the plurality of files associated with a first one of the plurality of interactive voice response programs, wherein the first file includes links to a plurality of audio files corresponding to a plurality of prompts, and
receive a second selection from the user, the second selection corresponding to a first link to a second one of the plurality of audio files; and
processing logic configured to:
access the second audio file based on the second selection, and
simultaneously play the second audio file and display text associated with the second audio file on the display device,
wherein the processing logic is further configured to:
generate the first file using a third file, wherein the third file is stored in a spreadsheet format and the first file is stored in a hypertext markup language format.

12. The system of claim 11, wherein the processing logic is further configured to:
provide a user interface configured to:

allow the user to select one or more properties associated with the plurality of prompts.

13. The system of claim 12, wherein a first one of the properties allows the user to select an order in which the plurality of prompts are to be displayed to the user.

14. The system of claim 12, wherein the user interface is further configured to:
allow the user to provide information identifying at least one location where the audio files are stored.

15. The system of claim 14, wherein the user interface is further configured to:
allow the user to identify a group of prompts using a first identifier.

16. The system of claim 15, wherein the first identifier comprises a name, a prefix or a location associated with the group of prompts.

17. A non-transitory computer-readable medium for testing an interactive voice response application, the non-transitory computer-readable medium having stored thereon a plurality of sequences of instructions, said sequences of instructions including instructions which, when executed by at least one processor, cause the at least one processor to:
provide a user interface to a user;
receive a first selection via the user interface, the first selection being associated with an interactive voice response program comprising a plurality of prompts;
access a first file based on the first selection, the first file being stored in a first format; and
generate a second file based on the first file, the second file having a second format and including links to audio files associated with the plurality of prompts, wherein when generating a second file, the instructions cause the at least one processor to:
insert the links in the second file, the links being associated with locations where the audio files associated with the plurality of prompts are stored, the instructions further causing the at least one processor to:
receive a second selection, via the user interface, corresponding to a first link to a first audio file, and
simultaneously play the first audio file and output text corresponding to the first audio file to a display device to allow the user to verify that the first audio file is accurate.

18. The non-transitory computer-readable medium of claim 17, further including instructions, which when executed by the at least one processor, cause the at least one processor to:
access the first audio file based on the second selection.

19. The non-transitory computer-readable medium of claim 17, wherein the first file comprises a spreadsheet type file and the second file comprises a hypertext markup language file.

20. The non-transitory computer-readable medium of claim 17, wherein the user interface is configured to receive information identifying locations where the audio files associated with the plurality of prompts are stored and when generating the second file, the instructions cause the at least one processor to:
insert the links associated with the identified locations into the second file, wherein a link for a first audio file associated with a first prompt is inserted in an area corresponding to text associated with the first prompt.

21. The non-transitory computer-readable medium of claim 17, wherein the instructions further cause the at least one processor to:
retrieve a first group of prompts in response to receiving an identifier via the user interface.

\* \* \* \* \*